United States Patent
Wehmeyer

(10) Patent No.: US 7,022,641 B2
(45) Date of Patent: *Apr. 4, 2006

(54) METHOD FOR PREPARING METAL CYANIDE CATALYSTS USING INSOLUBLE METAL SALTS

(75) Inventor: Richard M. Wehmeyer, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/506,066

(22) PCT Filed: Mar. 17, 2003

(86) PCT No.: PCT/US03/08001

§ 371 (c)(1),
(2), (4) Date: Aug. 30, 2004

(87) PCT Pub. No.: WO03/080239

PCT Pub. Date: Oct. 2, 2003

(65) Prior Publication Data

US 2005/0107642 A1    May 19, 2005

Related U.S. Application Data

(60) Provisional application No. 60/365,666, filed on Mar. 19, 2002.

(51) Int. Cl.
*B01J 27/26* (2006.01)
*B01J 31/00* (2006.01)

(52) U.S. Cl. ...................................... 502/175; 502/159

(58) Field of Classification Search ................ 502/175, 502/159

See application file for complete search history.

(56) References Cited

U.S. PATENT DOCUMENTS

| | | | |
|---|---|---|---|
| 3,278,457 A | 10/1966 | Milgrom | |
| 3,278,458 A | 10/1966 | Belner | |
| 3,278,459 A | 10/1966 | Herold | |
| 3,404,109 A | 10/1968 | Milgrom | |
| 3,427,256 A | 2/1969 | Milgrom | |
| 3,427,335 A | 2/1969 | Herold | |
| 4,472,560 A | 9/1984 | Kuyper et al. | |
| 4,477,589 A | 10/1984 | Van Der Hulst et al. | |
| 5,470,813 A | 11/1995 | Le-Khac | |
| 5,639,705 A | 6/1997 | Bowman et al. | |
| 5,783,513 A * | 7/1998 | Combs et al. | 502/175 |
| 6,348,565 B1 | 2/2002 | Wehmeyer | |
| 6,355,848 B1 | 3/2002 | Antons et al. | |
| 6,429,342 B1 | 8/2002 | Clement et al. | |

FOREIGN PATENT DOCUMENTS

| | | |
|---|---|---|
| WO | 01/04179 A1 | 1/2001 |
| WO | 01/04183 A1 * | 1/2001 |
| WO | 2001/090216 A1 | 11/2001 |
| WO | 03/080241 A1 | 10/2003 |

OTHER PUBLICATIONS

Kuyper et al, "*Hexacyanometallate Salts Used a Alkene-Oxide Polymerization Catalysts and Molecular Sleves,*" *Journal of Calalysis*, 105, and G. Boxhoorn, pp. 163-174 (1987).

* cited by examiner

Primary Examiner—Elizabeth D. Wood

(57) ABSTRACT

Metal cyanide catalyst dispersions in initiator compounds and/or polyethers are prepared by reacting an acidic metal cyanide compound with an insoluble metal salt in a medium that is a solvent for the acidic metal cyanide compound but not the metal salt. The resulting catalyst slurry may be combined with an initiator and stripping to form a catalyst/initiator or catalyst/polyether slurry. Using this method, an active alkylene oxide polymerization catalyst is prepared, and the preparation method is greatly simplified. Further, it is not necessary to use a separate organic complexing agent in the preparation.

15 Claims, No Drawings

METHOD FOR PREPARING METAL CYANIDE CATALYSTS USING INSOLUBLE METAL SALTS

This application claims benefit of U.S. Provisional Application No. 60/365,666, filed Mar. 19, 2002.

This invention relates to methods for making metal cyanide catalysts complexes and to methods for polymerizing alkylene oxides in the presence of a metal cyanide catalyst.

Polyethers are prepared in large commercial quantities through the polymerization of alkylene oxides such as propylene oxide and ethylene oxide. This polymerization reaction is usually conducted in the presence of an initiator compound and a catalyst. The initiator compound usually determines the functionality (number of hydroxyl groups per molecule of the polymer) and in some instances imparts some desired functionality. The catalyst is used to provide an economical rate of polymerization.

Metal cyanide complexes are becoming increasingly important alkylene oxide polymerization catalyst. These complexes are often referred to as "double metal cyanide" or "DMC" catalysts, and are the subject of a number of patents, including, for example, U.S. Pat. Nos. 3,278,457, 3,278,458, 3,278,459, 3,404,109, 3,427,256, 3,427,334, 3,427,335 and 5,470,813, among many others. In some instances, these complexes provide the benefit of fast polymerization rates and narrow polydispersities. Additionally, these catalysts are associated with the production of polyethers having very low levels of monofunctional unsaturated compounds.

Development efforts have focussed mainly on one specific metal cyanide catalyst complex, zinc hexacyanocobaltate, complexed with a specific complexing agent, t-butanol. The catalyst is typically prepared in a multistep process. First, separate solutions of zinc chloride and potassium hexacyanocobaltate are prepared. These solutions are then mixed together, followed immediately by adding a mixture of water and the complexing agent, t-butanol. A catalyst complex precipitates and is recovered and washed multiple times with mixtures of water and t-butanol. This washing process removes unwanted occluded ions, particularly potassium and chlorine, and contributes the complexing agent to the structure of the catalyst complex. Often, a polyether polyol is included in one or more of these washings. Finally, the catalyst complex is dried and ground. It is then mixed with an initiator compound and an alkylene oxide to prepare the desired polyether.

The process just described is complex, requiring several washing steps. It also requires that excesses of water and t-butanol be used. The t-butanol complexing agent itself causes the complex to be difficult to handle. Often, a polyether polyol must be added to facilitate easy handling of the catalyst complex.

Thus, it would be desirable to provide a less expensive, more convenient method for preparing a metal cyanide catalyst complex and a simple method for using such catalyst complexes.

This invention is a method for preparing a metal cyanide catalyst, comprising mixing an acidic metal cyanide compound with an insoluble metal salt in a solvent medium for the acidic metal cyanide compound under conditions such that the insoluble metal salt and the acidic metal cyanide compound react to form a multimetal cyanide catalyst insoluble in the solvent medium, wherein:

a) the acidic metal cyanide compound is represented by the general formula $H_w[M^1(CN)_r(X)_t]$ in which $M^1$ is a transition metal ion; each X represents a group other than cyanide that coordinates with the $M^1$ ion; r is from 4 to 6, t is from 0 to 2, and w represents the absolute value of the valence of the $M^1(CN)_r(X)_t$ group; and b) the insoluble metal salt is insoluble in the solvent medium and is represented by the general formula $M_xA_y$, wherein M is a metal ion that forms an insoluble precipitate with the metal cyanide grouping $M^1(CN)_r(X)_t$, A represents an anion that forms a salt of M that is insoluble in the solvent medium, and x and y are integers that balance the charges in the insoluble metal salt.

A second aspect of the invention is a method for preparing a metal cyanide catalyst, comprising mixing an acidic metal cyanide compound with an insoluble metal salt in an initiator or polyether compound under conditions such that the insoluble metal salt and the acidic metal cyanide compound react to form a multimetal cyanide catalyst insoluble in the initiator compound or polyether, wherein:

a) the acidic metal cyanide compound is represented by the general formula $H_w[M^1(CN)_r(X)_t]$ in which $M^1$ is a transition metal ion; each X represents a group other than cyanide that coordinates with the $M^1$ ion; r is from 4 to 6, t is from 0 to 2, and w represents the absolute value of the valence of the $M^1(CN)_r(X)_t$ group; and b) the insoluble metal salt is insoluble in the initiator or polyether compound compound and is represented by the general formula $M_xA_y$, wherein M is a metal ion that forms an insoluble precipitate with the metal cyanide grouping $M^1(CN)_r(X)_t$, A represents an anion that forms a salt with M that is insoluble in the solvent medium, and x and y are integers that balance the charges in the insoluble metal salt.

In a third aspect, this invention is a method of preparing a slurry of a metal cyanide catalyst in a nonvolatile initiator or polyether compound, comprising (I) mixing an acidic metal cyanide compound with an insoluble metal salt in a solvent medium for the acidic metal cyanide compound under conditions such that the insoluble metal salt and the acidic metal cyanide compound react to form a multimetal cyanide catalyst insoluble in the solvent medium, (II) dispersing the resulting mixture in the nonvolatile initiator compound to form a dispersion, and (III) removing at least one component of said solvent medium, wherein a) the acidic metal cyanide compound is represented by the general formula $H_w[M^1(CN)_r(X)_t]$ in which $M^1$ is a transition metal ion; each X represents a group other than cyanide that coordinates with the $M^1$ ion; r is from 4 to 6, t is from 0 to 2, and w represents the absolute value of the valence of the $M^1(CN)_r(X)_t$ group;

b) the insoluble metal salt is insoluble in the solvent medium and is represented by the general formula $M_xA_y$, wherein M is a metal ion that forms an insoluble precipitate with the metal cyanide grouping $M^1(CN)_r(X)_t$, A represents an anion that forms a salt with M that is insoluble in the solvent medium, and x and y are integers that balance the charges in the metal salt c) at least one component of said solvent medium is removable from said dispersion.

This method provides a convenient way to make metal cyanide catalysts. As is discussed more below, this method reduces or substantially eliminates alkali metals from the preparation method. As alkali metals tend to poison metal cyanide catalysts, conventional processes depend on washings to remove those ions. In this method, the washing steps to remove alkali metal ions become unnecessary, and the preparation method is therefore simplified. Preferably, no separate organic complexing agent compound is present in the preparation (other than the components of the solvent medium or the nonvolatile initiator compound), so that the costs associated with the use of the separate complexing agent are eliminated. In this process, multiple process steps, particularly catalyst washings with complexing agents and drying steps, become unnecessary unless it is desired to isolate a solid catalyst.

Further, the acidity/alkalinity of the catalyst is straightforwardly controlled through the selection of the ratios of components.

When used to polymerize alkylene oxides, the catalysts of the invention often exhibit low induction periods and fast polymerizations.

In another aspect, this invention is a process wherein a catalyst of any of the preceding aspects is mixed with an alkylene oxide and the resulting mixture subjected to conditions sufficient to polymerize the alkylene oxide to form a poly(alkylene oxide).

The acidic metal cyanide compound is represented by the general formula $H_w[M^1(CN)_r(X)_t]$, in which $M^1$, X, r, t and w are as described before.

$M^1$ is preferably $Fe^{+3}$, $Fe^{+2}$, $Co^{+3}$, $Co^{+2}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ and $V^{+5}$. Among the foregoing, those in the plus-three oxidation state are more preferred. $Co^{+3}$ and $Fe^{+3}$ are even more preferred and $Co^{+3}$ is most preferred.

Preferred groups X include anions such as halide (especially chloride), hydroxide, sulfate, carbonate, oxalate, thiocyanate, isocyanate, isothiocyanate, $C_{1-4}$ carboxylate and nitrite ($NO_2$—), and uncharged species such as CO, $H_2O$ and NO. Particularly preferred groups X are NO, $NO_2$— and CO.

r is preferably 5 or 6, most preferably 6; t is preferably 0 or 1, most preferably 0. w is usually 2 or 3, and is most typically 3. In most cases, r+t will equal six.

Mixtures of two or more acidic metal cyanide compounds can be used. In addition, the solution may also contain compounds that have the structure $H_wM^2(X)_6$, wherein $M^2$ is a transition metal and X is as before. $M^2$ may be the same as or different from $M^1$. The X groups in any $M^2(X)_6$ do not have to be all the same. Alkali metal salts of the acidic metal cyanide compound are preferably absent.

The acidic metal cyanide compound can be prepared in several ways. In one preparation technique, a solution of the corresponding alkali metal cyanide salt (i.e., $B_w[M^1(CN)_r(X)_t]$, where B represents an alkali metal ion) is formed. The solvent may be water, an inert organic compound as described more below, or a mixture of these. The solution may be performed at a slightly elevated temperature if necessary to dissolve the metal cyanide salt. The solution is mixed with a stoichiometric excess of a concentrated mineral acid of the form $H_dJ$, where J is an anion that forms an insoluble salt with B and d is the absolute value of the valence of J. Common mineral acids such as sulfuric acid and hydrochloric acid are preferred. Sulfuric acid is preferably used at a 75% or higher concentration, especially a 96% or higher concentration. Hydrochloric acid is preferably used at a 33–37% concentration in aqueous solution. HCl can also be added by introducing gaseous HCl or by adding a solution of HCl in an appropriate solvent (such as water, diethyl ether or isopropanol). The desired acidic metal cyanide compound ($H_w[M^1(CN)_r(X)_t]$) is formed in solution. The salt of B and J precipitates out from the resulting solution. Because the salt of B and J is usually hygroscopic, a significant portion of the water is removed from the solution with the salt. The salt is easily separated from the supernatant liquid by filtration, centrifuging or other solid-liquid separation technique. If desired, the salt may be washed with additional quantities of the organic compound in order to recover any occluded $H_w[M^1(CN)_r(X)_t]$ compound. If the salt of B and J is somewhat soluble in the solvent, a second solvent (such as an organic solvent) in which the salt of B and J is less soluble may be added in order to further facilitate the precipitation of the salt.

A second method of preparing the solution of the acidic metal cyanide compound is to first form a slurry of the corresponding alkali metal cyanide salt (i.e., $B_w[M^1(CN)_r(X)_t]$), in a mixture of an inert organic compound and a stoichiometric excess of a mineral acid, preferably hydrochloric acid. The hydrochloric acid can be supplied in various ways, such as by adding concentrated aqueous HCl, introducing gaseous HCl into the organic compound, or by adding a solution of HCl in an appropriate solvent (such as diethyl ether or isopropanol). An alkali metal salt of the acid forms and precipitates from the solution, leaving the desired $H_w[M^1(CN)_r(X)_t]$ compound dissolved in the organic compound. The precipitate is separated and if desired washed, as before.

In either of the foregoing two methods, an excess of mineral acid can be used to form an acidic solution. The excess acid used is available to react with the insoluble metal salt, as explained more below. Up to a five-fold excess of mineral acid is conveniently used.

A third convenient method of preparing the solution of the acidic metal cyanide compound is by ion exchange. An aqueous solution of the corresponding alkali metal salt (i.e., $B_w[M^1(CN)_r(X)_t]$) is eluted through a cation exchange resin or membrane which is originally in the hydrogen ($H^+$) form. Sufficient resin is used to provide an excess of $H^+$ ions. Suitable ion exchange resins include commonly available gel or macroporous, crosslinked polystyrene cation exchange resins, such as those sold by The Dow Chemical Company under the trade names DOWEX® MSC-1, DOWEX® 50WX4, as well as AMBERLYST® 15 ion exchange resin, sold by Rohm & Haas. The column is typically eluted with water until the desired acidic metal cyanide compound is recovered. The eluent is an aqueous solution of the $B_w[M^1(CN)_r(X)_t]$ compound. If an organic solution is desired, all or part of the water is removed from the eluent, yielding the desired acidic metal cyanide compound as solid precipitate or concentrated solution. This precipitate is then dissolved or dispersed in the organic compound. If desired, a quantity of water may be left in the acidic metal cyanide compound when it is mixed with the organic compound.

The insoluble metal salt is represented by the general formula $M_xA_y$. M is preferably a metal ion selected from the group consisting of $Zn^{+2}$, $Fe^{+2}$, $Co^{+2}$, $Ni^{+2}$, $Mo^{+4}$, $Mo^{+6}$, $Al^{+3}$, $V^{+4}$, $V^{+5}$, $Sr^{+2}$, $W^{+4}$, $W^{+6}$, $Mn^{+2}$, $Sn^{+2}$, $Sn^{+4}$, $Pb^{+2}$, $Cu^{+2}$, $La^{+3}$ and $Cr^{+3}$. M is more preferably $Zn^{+2}$, $Fe^{+2}$, $Co^{+2}$, $Ni^{+2}$, $La^{+3}$ and $Cr^{+3}$. M is most preferably $Zn^{+2}$.

The anion A is selected such that (1) the insoluble metal salt will react with the acidic metal cyanide compound to form an insoluble multimetal cyanide and (2) the insoluble metal salt is insoluble in the solvent medium. Suitable anions include $O^{-2}$, OH—$CO_3^{-2}$, $HCO_3$—, $PO_4^{-3}$, $HPO_4^{-2}$, $H_2PO_4$—, as well as silicate, titanate and/or zirconate ions. $O^{-2}$ and OH— are especially preferred, as they are neutralized to form water. Zinc oxide is most preferred. Commercial sources of ZnO include Zinc Corporation of America (coated and uncoated ZinVisible™ and Kadox-930 grades, for example) and Aldrich Fine Chemicals (catalog no. 20,553-2, for example).

Mixtures of two or more insoluble metal salts can be used. In such cases, the metals in the insoluble metal salt compounds do not have to be the same.

The solvent medium is one that meets several requirements. The solvent medium is a solvent for the acidic metal cyanide compound and any $H_w M^2(X)_6$ compounds that may be used. It is inert to the acidic metal cyanide compound and any $H_w M^2(X)_6$ compounds that may be present. In addition, it is inert to the insoluble metal salt (other than due to the presence of auxiliary acids, as discussed below). It is not a solvent for the multimetal metal cyanide compound that is formed in the reaction of the insoluble metal salt and the acidic metal cyanide compound.

Thus, suitable solvent media include water and polar organic compounds such as, for example, monoalcohols such as methanol, ethanol, n-propanol isopropanol, n-butanol, isobutanol, t-butanol, 3-butyn-1-ol, 3-butene-1-ol, propargyl alcohol, 2-methyl-2-propanol, 2-methyl-3-butyn-2-ol, 2-methyl-3-butene-2-ol, 3-butyn-1-ol, 3-butene-1-ol and the like; halogenated alcohols such as 2-chloroethanol, 2-bromoethanol, 2-chloro-1-propanol, 3-chloro-1-propanol, 3-bromo-1-propanol, 1,3-dichloro-2-propanol, 1-chloro-2-methyl-2-propanol as well as nitroalcohols, keto-alcohols, ester-alcohols, cyanoalcohols, and other inertly substituted alcohols, polyalcohols such ethylene glycol, propylene glycol, diethylene glycol, triethylene glycol, higher polyethylene glycols and polypropylene glycols), glycerine, trimethylolpropane and the like; ethers such as tetrahydrofuran and 1,4-dioxane; ketones such as acetone and methyl ethyl ketone; esters such as methyl acetate and ethyl acetate, nitriles such as acetonitrile, and dimethyl sulfoxide. Further, any of the non-volatile initiator materials described below can be used as all or part of the solvent medium. Mixtures of water and any of the foregoing polar organic compounds can be used. Similarly, mixtures of any two or more of the foregoing organic compounds can be used. Preferred solvent media are methanol, mixtures of methanol and water, mixtures of methanol and one or more polyalcohols, and mixtures of water, methanol and one or more polyalcohols are preferred. The polyalcohol is preferably nonvolatile and miscible with the remainder of the solvent medium.

It is noted that the solvent medium may include materials that are known to form complexes with multimetal cyanide catalysts, and/or act as initiators for the polymerization of alkylene oxides. In those cases, it is possible that the solvent medium (or some portion of it) becomes incorporated into the precipitated catalyst, and/or that, if not removed, will remain with the catalyst and act as an initiator when the catalyst is used to polymerize alkylene oxide polymerizations.

It is preferred to minimize or even eliminate water in the solvent medium. However, when the insoluble metal salt is an oxide or hydroxide, water will be formed as the insoluble metal salt reacts with the acidic metal cyanide compound. In such cases, the solvent media will thus include at least the water formed in the reaction.

It is also preferred to use a relatively volatile material as all or part of the solvent medium. Such volatile materials are readily removed from the precipitated catalyst, or a slurry of the precipitated catalyst in a non-volatile initiator, by stripping under vacuum under conditions of 80° C. and 30 Torr (4 kPa) vacuum (or any lower temperature and/or pressure). Water, alcohols and ethers having a molecular weight of about 85 or less tend to meet these criteria. In these cases, the volatile solvent medium preferably is miscible with a non-volatile initiator compound that is used in the subsequent alkylene oxide polymerization. Even more preferably, the solvent medium is relatively low boiling or otherwise easily stripped from the non-volatile initiator compound.

The insoluble metal salt may be directly mixed with the solution of the acidic metal cyanide compound, or else first formed into a slurry in a portion of the solvent medium. In the latter case, the slurry is mixed with the solution of the acidic metal cyanide compound in order to conduct the reaction and form the multimetal cyanide. If a separate slurry of the insoluble metal salt is made, the solvent medium used in making the slurry is preferably the same as used in the acidic metal cyanide compound solution. If a solvent medium is used, it is preferably miscible with that used in the acidic metal cyanide compound solution. It is generally preferred to add the solution of the acidic metal cyanide compound to the insoluble salt.

Except in cases in which an optional soluble metal salt is present, as described below, the insoluble metal salt and the acidic metal cyanide compound are mixed in proportions such that at least a stoichiometric amount of the insoluble metal salt is provided, based on the amount of acidic metal cyanide compound. Preferably about 1.2 to about 4 moles of metal ion (M) are delivered per mole of $M^1(CN)_r(X)_t$ ion (or combined moles of $M^1(CN)_r(X)_t$ and $M^2(X)_6$ ions, when $M_2(X)_6$ ions are present). It is preferred that the mixing be done with agitation. Agitation is preferably continued for a period after the mixing is completed. The metal cyanide catalyst, $M_b[M^1(CN)_r(X)_t]_c[M^2(X)]_d$, precipitates and forms a fine dispersion in the solvent medium.

A soluble metal salt of the formula $M_x A^1_y$, wherein M is as described before, $A^1$ represents an anion that forms a soluble salt with M, and x and y are integers that balance the charges in the soluble metal salt, may be present in addition to the insoluble metal salt. $A^1$ is suitably a halide such as chloride and bromide, nitrate, sulfate, carbonate, cyanide, oxalate, thiocyanate, isocyanate, perchlorate, isothiocyanate, an alkanesulfonate such as methanesulfonate, an arylenesulfonate such as p-toluenesulfonate, trifluoromethanesulfonate (triflate) and a $C_{1-4}$ carboxylate. Chloride ion is especially preferred.

If the soluble metal salt is present, then it too can react with the acidic metal cyanide compound (and auxiliary acid, if present, as discussed below), if there is not enough insoluble metal salt present to consume those materials. When a mixture of insoluble and soluble metal salts is present, advantageously there is provided at least about 1.0, preferably at least about 1.5, more preferably at least about 2.0, up to about 4.0, preferably to about 3.0 moles of insoluble metal salt per mole of acidic metal cyanide compound. Further, the combined amount of insoluble and soluble metal salts is sufficient to fully consume the acidic metal cyanide compound (i.e., at least one mole of metal salts per mole of acidic metal cyanide compound). More preferably, the combined amount of insoluble and insoluble metal salts provides from about 1.8 to about 4 moles of metal salts per mole of acidic metal cyanide compound.

If only a stoichiometric amount of metal salt is used during the precipitation step, the catalyst can be treated with additional metal salt (soluble or insoluble) in a subsequent step.

If desired, a quantity of an auxiliary acid may be present during the catalyst precipitation reaction. The auxiliary acid is an acid that is soluble in the solvent media, and is not an $H_w[M^1(CN)_r(X)_t]$ compound. The auxiliary compound may be, for example, a mineral acid of the form $H_d J$, as described before, or an acid of the type $H_w M^2(X)_6$, where $M^2$ is a transition metal ion and H, w and X are as described before.

In this context, a preferred anion X is fluoride. Preferred auxiliary acids include sulfuric acid, hydrochloric acid, hexaflurotitanic acid, hexafluorozirconic acid, and the like. The auxiliary acid may be present in quantities of from 0, preferably about 0.25, more preferably about 0.5, to about 5, preferably about 4, more preferably about 3, even more preferably about 1.5 moles per mole of acidic metal cyanide compound. This can be added in the preparation of the acidic metal cyanide compound if desired.

It is not necessary to provide enough of the insoluble metal salt (or insoluble metal salt plus soluble metal salt) to consume the auxiliary acid, although that may be done if desired. However, any excess insoluble metal salt will consume a like number of equivalents of the auxiliary acid to form the corresponding salt. By selecting how much of the auxiliary acid to consume, the pH of the catalyst slurry can be controlled. The pH of the catalyst slurry is advantageously controlled to about 3 to about 7, more preferably from about 4 to about 6.5, through the selection of the amount of insoluble and soluble metal salts, when an auxiliary acid is used.

If enough insoluble metal salt is present to consume the acidic metal cyanide compound and auxiliary acid, any soluble metal salt tends to be a "spectator" material, which, although it may participate in the reaction, is regenerated, so the overall reaction does not involve a net consumption of the soluble metal salt.

Thus, several combinations of starting materials can be used, as follows:

A. Acidic metal cyanide compound and insoluble metal salt, without auxiliary acid or soluble metal salt. In this case, at least enough insoluble metal salt is used to consume the acidic metal cyanide compound, with an excess of the insoluble metal salt being preferable. An idealized example of such a reaction is:

$$2H_3Co(CN)_6 + 3ZnO \rightarrow 2Zn_{1.5}Co(CN)_6 + 3H_2O \quad (I)$$

B. Acidic metal cyanide compound and mixture of insoluble and soluble metal salts, without auxiliary acid. The combined amount of metal salts is sufficient to consume the acidic metal cyanide compound, with an excess being preferable. The insoluble metal salt is present in an amount sufficient to consume at least 30%, preferably at least about 50%, more preferably at least about 75%, even more preferably all of the acidic metal cyanide compound by itself. The soluble metal salt will react with the acidic metal cyanide compound if there is not enough insoluble metal compound present to react with it all; otherwise, the soluble metal salt is a "spectator" material as discussed above. Idealized examples of such a reaction are:

$$2H_3Co(CN)_6 + 2ZnO + 2ZnCl_2 \rightarrow 2Zn_{1.5}Co(CN)_6 + 2H_2O + 2HCl + ZnCl_2 \quad (II)$$

$$2H_3Co(CN)_6 + 3ZnO + ZnCl_2 \rightarrow 2Zn_{1.5}Co(CN)_6 + ZnCl_2 + 3H_2O \quad (III)$$

In reaction (II), there is not enough ZnO to consume the acidic metal cyanide compound, so part of the ZnCl₂ reacts with the remaining acidic metal cyanide compound and the remainder is "spectator" material as discussed above. In reaction (III), all of the zinc chloride is "spectator material", as there is enough ZnO to consume all of the acidic metal compound.

C. Acidic metal cyanide compound, auxiliary acid and insoluble metal salt, without soluble metal salt. Here, at least enough insoluble metal salt is present to consume the acidic metal cyanide compound, with an excess of insoluble metal salt (relative to the acidic metal cyanide compound) being preferred. Excess insoluble metal salt will consume all or part of the auxiliary acid, forming the salt of the metal M and the conjugate base of the auxiliary acid. The pH of the catalyst slurry is controllable through the amount of the auxiliary acid that is consumed. Idealized examples of such a reaction are:

$$2H_3Co(CN)_6 + H_2SO_4 + 4ZnO \rightarrow 2Zn_{1.5}Co(CN)_6 + ZnSO_4 + 4H_2O \quad (IV)$$

$$2H_3Co(CN)_6 + 2H_2SO_4 + 4ZnO \rightarrow 2Zn_{1.5}Co(CN)_6 + ZnSO_4 + H_2SO_4 + 4H_2O \quad (V)$$

$$2H_3Co(CN)_6 + 2H_2ZrF_6 + 5ZnO \rightarrow 2Zn_{1.5}Co(CN)_6 + ZnZrF_6 + ZnO + 4H_2O \quad (VI)$$

In reaction (IV), enough ZnO is present to consume all starting acids, whereas in reaction (V) an excess of auxiliary acid is present and in reaction (VI), and excess of insoluble metal compound (ZnO) is present. In all cases, enough ZnO is present to consume the acidic metal cyanide compound.

D. Acidic metal cyanide compound, auxiliary acid, plus mixture of insoluble and soluble metal salts. The combined amount of metal salts is at least sufficient to consume the acidic metal cyanide compound, with an excess being preferable. The insoluble metal salt is present in an amount sufficient to consume at least 30%, preferably at least about 50%, more preferably at least about 75%, even more preferably all of the acidic metal cyanide compound by itself. Excess insoluble metal salt will consume all or part of the auxiliary acid, forming the salt of the metal M and the conjugate base of the auxiliary acid. The pH of the catalyst is controllable through the amount of the auxiliary acid that is consumed. If enough insoluble metal salt is present to consume all acids, the soluble metal salt will be a "spectator" material as discussed above. Idealized examples of such a reaction are:

$$2H_3Co(CN)_6 + H_2SO_4 + 4ZnO + ZnCl_2 \rightarrow 2Zn_{1.5}Co(CN)_6 + ZnSO_4 + ZnCl_2 + 4H_2O \quad (VII)$$

$$2H_3Co(CN)_6 + 2H_2SO_4 + 2ZnO + 2ZnCl_2 \rightarrow 2Zn_{1.5}Co(CN)_6 + ZnSO_4 + H_2SO_4 + 2H_2O + 4HCl\uparrow \quad (VIII)$$

$$2H_3Co(CN)_6 + 2H_2SO_4 + 4ZnO + ZnCl_2 \rightarrow 2Zn_{1.5}Co(CN)_6 + 2ZnSO_4 + 2HCl\uparrow + 4H_2O \quad (IX)$$

In reaction (VII), the ZnCl₂ is a "spectator" material, as sufficient ZnO is provided to consume all acids. In reaction (VIII), sufficient metal salts are present to consume the acidic metal cyanide compound but only part of the auxiliary acid. In reaction (IX) all of the ZnO and the ZnCl₂ go to consume the acids. Note that in cases such as reactions (VIII) and (IX), H₂SO₄ and HCl (and their salts) can exist in equilibrium unless HCl is removed. In the preferred process, the slurry is stripped to remove volatile materials, and HCl is removed in this manner.

Upon reacting, the catalyst precipitates to form a slurry in the solvent medium. From this point, the catalyst can be isolated from the solvent medium and worked up to form a solid, particulate catalyst using, for example, conventional methods. Alternatively and preferably, the slurry is then formed into a dispersion in an initiator or polyether compound.

To make a solid catalyst, the precipitate is isolated by, for example, filtering under vacuum, and is typically washed one or more times with water, a complexing agent, or a mixture of water and complexing agent. Following the washings, the catalyst is dried and ground to form a particulate catalyst. Such methods of preparing a particulate DMC catalyst are described, for example, in U.S. Pat. Nos. 3,278,457, 3,278,458, 3,278,459, 3,404,109, 3,427,256, 3,427,334, 3,427,335 and 5,470,813, all incorporated herein by reference.

In the preferred method, the catalyst is then dispersed into a non-volatile initiator compound or a polyether. The non-volatile initiator compound is an organic material having at least one heteroatom-containing group that will react with an alkylene oxide to form a covalent bond between a carbon atom of the alkylene oxide and the heteroatom, and opening the ring of the alkylene oxide to form a terminal hydroxyl group, thereby forming a higher molecular weight polymer product. Suitable non-volatile initiator compounds are not readily strippable from the slurry at conditions of 60° C. and 150 Torr (20 kPa) and preferred ones are not strippable from the slurry at 80° C. and 30 Torr (4 kPa) vacuum. Alcohols, thiols (R-SH compounds) and aliphatic carboxylic acids having a molecular weight of 87 or more, preferably about 87–8000, especially 87–5000, even more especially 87–1000 tend to meet these criteria. The non-volatile initiator compound may contain as few as one or as many as eight or more such heteroatom-containing groups, depending on the desired nominal functionality of the product polyether. In addition, the non-volatile initiator compound may contain one or more other functional groups that may be desirable in the product polyether, such as alkenyl or alkynyl unsaturation.

The catalyst may be dispersed into the non-volatile initiator compound and/or polyether after precipitation of the catalyst. Alternatively, the nonvolatile initiator or polyether may be included as part or all of the solvent medium. Mixtures of non-volatile initiators and/or polyethers can be used. Part of the non-volatile initiator or polyether may be present during the catalyst precipitation step, with the remainder being added afterward, if desired.

Suitable non-volatile initiator compounds include monoalcohols such 1-t-butoxy-2-propanol, octanol octadecanol, and the like. Suitable nonvolatile polyalcohol initiators include glycerine, 1,1,1-trimethylol propane, 1,1,1-trimethylol ethane, 1,2,3-trihydroxybutane, pentaerythritol, xylitol, arabitol, mannitol, 2,5-dimethyl-3-hexyn-2,5-diol, 2,4,7,9-tetramethyl-5-decyne-4,7-diol, sucrose, sorbitol, alkyl glucosides such as methyl glucoside and ethyl glucoside and the like. Polyether polyols, particular those having an equivalent weight of about 350 or less, more preferably about 125–250, are also useful initiator compounds.

The polyether may be a polymer of propylene oxide and/or ethylene oxide, having an equivalent weight of 1000–8000. The polyether, in this context, either contains no heteroatom-containing group that is reactive with an alkylene oxide under polymerization conditions, or otherwise does not react to an appreciable extent with the alkylene oxide during the polymerization to form a higher molecular weight polymer product. Polyethers of particular interest are polyether polyols that are the desired product of a polymerization reaction catalyzed by the DMC catalyst of the invention.

At least enough of the metal cyanide catalyst complex is dispersed in the non-volatile initiator or polyether to provide a catalytically effective amount of the catalyst complex in the mixture. Thus, the amount of catalyst complex added is generally at least about 50 ppm, based on the combined weight of the non-volatile initiator (and/or polyether) plus catalyst complex, preferably at least about 200 ppm, more preferably at least about 1000 ppm. It is more preferred to form a more concentrated dispersion of the metal catalyst in the non-volatile initiator and/or polyether. Such a more concentrated dispersion can be divided and/or diluted with additional non-volatile initiator and/or polyether when it is used to prepare a polyether. Preferably, the concentrated non-volatile initiator (or polyether)/catalyst complex mixture will contain from about 0.2 weight percent, more preferably from about 0.5 weight percent, most preferably from about 1 weight percent, especially from about 2 weight percent, to about 50 weight percent, preferably about 25 weight percent, more preferably about 10 weight percent, especially up to about 5 weight percent, metal catalyst complex, based on the combined weight of metal catalyst complex (as $M_b[M^1(CN)_r(X)_t]_c[M^2(X)_6]_d \cdot nM^3{}_xA_y$) and non-volatile initiator and/or polyether. This more concentrated dispersion can be diluted for use.

A preferred way of dispersing the catalyst in the nonvolatile initiator or polyether is to mix the slurry of catalyst and solvent medium with the non-volatile initiator or polyether, and then remove the solvent medium. The method of removing the solvent medium will depend somewhat on the particular organic compound and non-volatile initiator or polyether. However, in most cases at least one component of the solvent medium will be more volatile than the nonvolatile initiator and polyether, and is conveniently stripped through the application of heat and/or vacuum, such as heating to approximately 40–80° C. under a vacuum, such as a vacuum less than 300 torr (40 kPa), especially 15–30 torr (2–4 kPa) or less. A nitrogen sweep or sparge, or a solvent that forms an azeotrope with the organic compound and/or water, can be used if desired to improve the removal of volatiles and water. Stripping conditions are preferably selected so that the bulk of the water (if any) in the slurry is stripped simultaneously with the organic compound. It has been found that when the organic compound is fractionated from the water in the overheads distillate (particularly in the preferred case where the organic compound is methanol) during the distillation, the catalyst sometimes exhibits longer induction times or lower activity. Water is preferably removed to a level of about 5000 ppm or below, preferably to about 3000 ppm or below, more preferably to about 2500 ppm or below.

In an alternative embodiment of the invention, the catalyst is precipitated directly in a polyether or solvent medium that also functions as an initiator compound. As before, mixtures of acidic metal cyanide compounds can be used, and an $H_yM^2(X)_6$ compound can be included if desired. Upon mixing the reactants, the catalyst precipitates to form a catalyst/initiator or catalyst polyether slurry that can be used directly in making poly(alkylene oxide) polymers and copolymers as described below. In this aspect, an amount of water or additional organic compound can be mixed into the starting solutions if needed to improve the dissolution of the acidic metal cyanide compound. If water or additional organic compound is used, it is advantageously stripped from the product slurry as described, before it is used to polymerize alkylene oxides.

In either of the foregoing processes, the resulting product is usually a fine dispersion of the metal cyanide catalyst complex in an initiator and/or polyether. The metal cyanide catalyst complex is present in an active form, and no other treatment or preparation is required.

The metal-containing cyanide catalyst made in accordance with this invention can be represented by the general formula:

$$M_b[M^1(CN)_r(X)_t]_c[M^2(X)_6]_d \cdot nM^3{}_xA_y$$

wherein M, $M^1$, $M^2$, X, A, n, r, t, x and y are all as defined before, $M^3$ is defined the same way as M, b, c and d are numbers that reflect an electrostatically neutral complex, and n is a number indicating the relative number of moles of $M^3_xA_y$. $M^3$ may be the same or different than M. $M^3_xA_y$ can be a mixture of two or more materials.

Among the catalysts of particular interest are:
Zinc hexacyanocobaltate.$nZnSO_4$;
$Zn_s[Co(CN)_5NO].nZnSO_4$;
$Zn_s[Co(CN)_6]_o[Fe(CN)_5NO]_p.nZnSO_4$ (o, p=positive numbers, s=1.5o+p);
$Zn_s[Co(CN)_6]_o[Co(NO_2)_6]_p[Fe(CN)_5NO]_q.nZnSO_4$ (o, p, q=positive s=1.5(o+p)+q);

as well as the various complexes such as are described at column 3 of U.S. Pat. No. 3,404,109, incorporated herein by reference. In the foregoing formula, the $ZnSO_4$ can be replaced by or supplemented with $ZnCl_2$.

The catalyst complex of the invention is used to polymerize alkylene oxides to make polyethers. In general, the process includes mixing a catalytically effective amount of the catalyst/initiator or catalyst/polyether dispersion with an alkylene oxide under polymerization conditions and allowing the polymerization to proceed until the supply of alkylene oxide is essentially exhausted. The concentration of the catalyst is selected to polymerize the alkylene oxide at a desired rate or within a desired period of time. An amount of catalyst sufficient to provide from about 5 to about 10,000 parts by weight metal cyanide catalyst (calculated as $M_b[M^1(CN)_r(X)_t]_c[M^2(X)_6]_d.nM^3_xA_y$, exclusive of any associated water and initiator) per million parts combined weight of alkylene oxide, and initiator and comonomers, if present. More preferred catalyst levels are from about 20, especially from about 30, to about 5000, more preferably to about 1000 ppm, even more preferably to about 150 ppm, on the same basis.

Among the alkylene oxides that can be polymerized with the catalyst complex of the invention are ethylene oxide, propylene oxide, 1,2-butylene oxide, styrene oxide, epichlorohydrin and mixtures thereof. Various alkylene oxides can be polymerized sequentially to make block copolymers. More preferably, the alkylene oxide is propylene oxide or a mixture of propylene oxide and ethylene oxide and/or butylene oxide. Especially preferred are propylene oxide alone or a mixture of at least 75 weight % propylene oxide and up to about 25 weight % ethylene oxide.

In addition, monomers that will copolymerize with the alkylene oxide in the presence of the catalyst complex can be used to prepare modified polyether polyols. Such comonomers include oxetanes as described in U.S. Pat. Nos. 3,278,457 and 3,404,109, and anhydrides as described in U.S. Pat. Nos. 5,145,883 and 3,538,043, which yield polyethers and polyester or polyetherester polyols, respectively. Hydroxyalkanoates such as lactic acid, 3-hydroxybutyrate, 3-hydroxyvalerate (and their diners), lactones and carbon dioxide are examples of other suitable monomers that can be polymerized with the catalyst of the invention.

The polymerization reaction typically proceeds well at temperatures from about 25 to about 150° C. or more, preferably from about 80–130° C. A convenient polymerization technique involves charging the catalyst to a reactor and pressurizing the reactor with the alkylene oxide. An additional initiator compound (in addition to any present in the catalyst slurry) is generally added prior to the introduction of the monomers. Polymerization proceeds after a short induction period as indicated by a loss of pressure in the reactor. Once the polymerization has begun, additional alkylene oxide is conveniently fed to the reactor on demand until enough alkylene oxide has been added to produce a polymer of the desired equivalent weight. Short induction periods are often seen.

Another convenient polymerization technique is a continuous method. In such continuous processes, the activated catalyst is continuously fed into a continuous reactor such as a continuously stirred tank reactor (CSTR) or a tubular reactor. A feed of alkylene oxide is introduced into the reactor and the product continuously removed. Additional initiator can be added continuously or intermittently, with the catalyst slurry or as a separate stream. Those catalysts exhibiting a particularly short induction period, such as less than 15 minutes, preferably less than 10 minutes, and especially less than 5 minutes, are particular suitable for use in processes where the catalyst is added continuously.

The catalyst of this invention is especially useful in making propylene oxide homopolymers and random copolymers of propylene oxide and up to about 15 weight percent ethylene oxide (based on all monomers). The polymers of particular interest have a hydroxyl equivalent weight of from about 800, preferably from about 1000, to about 5000, preferably about 4000, more preferably to about 2500, and unsaturation of no more than 0.025 meq/g, preferably from about 0.005 to 0.02 meq/g.

The product polymer may have various uses, depending on its molecular weight, equivalent weight, functionality and the presence of any functional groups. Polyether polyols so made are useful as raw materials for making polyurethanes. Polyethers can also be used as surfactants, hydraulic fluids, as raw materials for making surfactants and as starting materials for making aminated polyethers, among other uses.

The following examples are provided to illustrate the invention, but are not intended to limit its scope. All parts and percentages are by weight unless otherwise indicated. Catalyst loadings are calculated from the starting materials and ignoring any associated water and initiator.

Preparations of $H_3Co(CN)_6$ Solutions $H_3Co(CN)_6$ solution A: $K_3Co(CN)_6$ (FW 332.35, 20.0 g, 60.18 mmol) is dissolved with slight warming (40–50° C.) in deionized water (46.6 g). A solution of 96% $H_2SO_4$ (18.44 g, approximately 180.5 mmol $H_2SO_4$) is added slowly dropwise over about 10 minutes to the stirred, warm solution of $K_3Co(CN)_6$. A light yellow solution is obtained, which is cooled to 45° C. with stirring. Methanol (200 g) is added to the solution over 5 minutes. During the addition, $K_2SO_4$ and/or $KHSO_4$ precipitates as a granular white solid. The resultant slurry is stirred for 5–10 min while cooling to 35° C. The slurry is placed in an ice water bath, stirred for 30 minutes, and vacuum filtered to remove the precipitate. The salt cake is rinsed with methanol to aid in deliquoring; the rinses are combined with the filtrate. The filtrate is a light yellow, clear solution weighing 269.53 g, containing a maximum of 4.87% $H_3Co(CN)_6$. The solution contains 1.12 meq $H^+/g$ by titration.

$H_3Co(CN)_6$ solution B: $K_3Co(CN)_6$ (FW 332.35, 20.0 g, 60.18 mmol) is dissolved with warming (60–65° C.) in deionized water (35 g). A solution of 96% $H_2SO_4$ (17.82 g,) is added slowly dropwise over about 15 minutes to the stirred, warm solution of $K_3Co(CN)_6$. A light yellow solution is obtained, which is cooled to 45° C. with stirring. Methanol (400 g) is added to the solution over 25–30 minutes. $K_2SO_4$ and/or $KHSO_4$ precipitates during the methanol addition. The resultant slurry is stirred for about 1.5 hours while cooling to 25° C. The slurry is placed in an ice water bath, stirred for 30 minutes, and vacuum filtered to remove the precipitate. The salt cake is rinsed with another 50 g of methanol to aid in deliquoring; this methanol is then combined with the filtrate. The filtrate is a light yellow, clear solution weighing 513.9 g, containing a maximum of 2.55% $H_3Co(CN)_6$.

$H_3Co(CN)_6$ solution C: $K_3Co(CN)_6$ (FW 332.35, 10.0 g, 30.09 mmol) is dissolved with slight warming (60–65° C.) in deionized water (17.5 g). A solution of 96% $H_2SO_4$ (8.92 g, approximately 90.9 mmol $H_2SO_4$) is added dropwise over about 15 minutes to the stirred, warm solution of $K_3Co(CN)_6$. A light yellow solution is obtained, which is cooled to 45° C. with stirring. Methanol (200 g) is added to the solution over 5 minutes. During the addition, $K_2SO_4$ and/or $KHSO_4$ precipitates as a granular white solid. The resultant slurry is stirred for 5–10 min while cooling to 25° C. The slurry is vacuum filtered to remove the precipitate. The salt cake is rinsed with methanol to aid in deliquoring; the rinses are combined with the filtrate. The filtrate is a light yellow, clear solution weighing 246.35 g, containing a maximum of 2.66% $H_3Co(CN)_6$.

$H_3Co(CN)_6$ solution D: $K_3Co(CN)_6$ (FW 332.35, 20.0 g, 60.18 mmol) is dissolved in deionized water (51.6 g). A solution of 96% $H_2SO_4$ (18.44 g, approximately 180.5 mmol $H_2SO_4$) is added slowly dropwise over about 10 minutes to the stirred solution of $K_3Co(CN)_6$. A light yellow solution is obtained, which is cooled to 40° C. with stirring. Methanol (80 g) is added to the solution over 10 minutes. During the addition, $K_2SO_4$ and/or $KHSO_4$ precipitates as a granular white solid. The resultant slurry is stirred for 5–10 minutes while cooling to 35° C. The slurry is placed in an ice water bath, stirred for 30 minutes, and vacuum filtered to remove the precipitate. The salt cake is rinsed with methanol (18 g total) to aid in deliquoring; the rinses are combined with the filtrate. The filtrate is a light yellow, clear solution weighing 170.51 g, containing a maximum of 7.70% $H_3Co(CN)_6$.

$H_3Co(CN)_6$ solution E: 100 g of dry DOWEX™ MSC-1 cation exchange resin beads are slurried in water and poured into a glass column. The resulting bed is 1 inch in diameter X 12–13 inches in height. 100 ml of a 12M HCl solution in deionized water is passed through the column to convert the exchange sites to the $H^+$ form. The column is then eluted with deionized water. The eluent stabilizes at about pH 5. A solution of 9.97 g (30.0 mmol) $K_3Co(CN)_6$ in 40 g water is eluted through the column with about 250 g water. 282.72 g of eluent is collected, containing 2.313% $H_3Co(CN)_6$.

$H_3Co(CN)_6$ solution F: A light yellow, clear solution weighing 170.51 g, containing a maximum of 7.70% $H_3Co(CN)_6$, made in a manner similar to solution D.

$H_3Co(CN)_6$ solution G: $K_3Co(CN)_6$ (FW 332.35, 20.0 g, 60.18 mmol) is dissolved with slight warming (40–50° C.) in deionized water (46.6 g). A solution of 96% $H_2SO_4$ (24.59 g, approximately 240.7 mmol $H_2SO_4$) is added slowly dropwise over about 20 minutes to the stirred, warm solution of $K_3Co(CN)_6$. A light yellow solution is obtained, which is cooled and stirred for 5 minutes. The temperature is maintained at about 49° C. Methanol (200 g) is added dropwise to the solution over 33 minutes. During the addition, $K_2SO_4$ and/or $KHSO_4$ precipitates as a granular white solid. The resultant slurry is cooled to 8–9° C. over about 80 minutes and vacuum filtered to remove the precipitate. The salt cake is rinsed with methanol to aid in deliquoring; the rinses are combined with the filtrate. The filtrate is a light yellow, clear solution weighing 287.79 g, containing a maximum of 4.40% $H_3Co(CN)_6$. The solution contains 1.407 meq $H^+/g$ by titration.

$H_3Co(CN)_6$ solution H. A light yellow, clear solution containing 4.17 wt.-% $H_3Co(CN)_6$ solution made in a manner similar to solution G.

Propylene Oxide Polymerization Procedures

A. Vial method. A glass vial is charged with catalyst/initiator slurry, additional initiator, and propylene oxide, sealed and heated to 90° C. for 18–21 hours. The progress of the reaction is followed visually. The reaction is considered to have begun when the vial contents become clear. Polymerization is indicated by the reaction contents becoming viscous. The % yield of polymer, based on conversion of propylene oxide, is calculated after removing unreacted propylene oxide.

B. 500 ml reactor method. The catalyst slurry is mixed with additional initiator of the same type to provide a predetermined catalyst charge. The mixture is rotoevaporated to remove volatiles, and then charged to the reactor. The reactor contents are heated to 105° C. An initial charge of 10 ml propylene oxide is added over 3 minutes to provide 10–14% propylene oxide in the resulting mixture. The pressure inside the reactor is monitored, a drop in pressure indicating that the induction period has ended and the polymerization begun. Propylene oxide is then fed to the reactor at a predetermined rate until enough propylene oxide is added to form a polyol of a target molecular weight. The reaction is then stopped and the polyol recovered. Molecular weight is determined by end-group (—OH) analysis, and end group unsaturation is determined using standard methods. Viscosity at 100 and 210° F. is measured in some cases.

EXAMPLE 1

Preparation and Evaluation of Catalyst Slurry 1A 26.87 g of $H_3Co(CN)_6$ solution A (which contains about 5.4–46.0 mmol $H_3Co(CN)_6$ and about 6.0 mmol $H_2SO_4$) is mixed with 96% $H_2SO_4$ (0.61 g, 6.0 mmol), and the mixture is added dropwise over 80 minutes with stirring to a slurry of ZnO (1.95 g, 24.0 mmol) and trimethylolpropane DMP, 4.78 g, 35.6 mmol) in methanol (80 g). A small quantity of methanol is used to rinse the equipment. Most of the ZnO disappears as it reacts during the addition. The slurry is stirred for 20 minutes after the addition is completed. Finely divided particles of DMC catalyst are suspended in a liquid phase having pH of 5. Some unreacted ZnO remains. The idealized reaction can be expressed as:

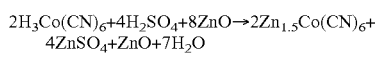

Voranol™ 2070 polyol (a 700 molecular weight poly (propylene oxide triol from Dow Chemical) (95.65 g) is then added and the mixture is stirred overnight. Volatiles (including the methanol) are then distilled from the slurry on a rotoevaporator, at temperatures gradually increasing to 75–80° C. and vacuum gradually increasing to 15–30 Torr (2–4 kPa), with a slight nitrogen sweep. The final product weight 104.48 g, has a pH of 6, and contains about 2.97% dispersed DMC catalyst particles.

Slurry catalyst 1A is evaluated using the 500 ml reactor method. Enough of the slurry catalyst is used to provide 1500 ppm DMC catalyst in the starting slurry/initiator mixture. The PO feed rate is 5 ml/min. The induction period is 15 minutes. The resulting polymer has a molecular weight of 2878 and an unsaturation level of 0.016 meq/g. Polymer viscosity is 291.6 cSt at 100° F. and 39.6 cSt at 210° F.

Preparation and Evaluation of Catalyst Slurry 1B

Catalyst Slurry 1B is a scaled-up version of Catalyst Slurry 1A. Seven individual batches of catalyst slurry are each made as follows:

40 g of $K_3Co(CN)_6$ are weighed into a 1000 ml Erlenmeyer flask equipped with stir bar. 93.2 g deionized water are added. The mixture is heated to 45° C. to dissolve the $K_3Co(CN)_6$. 36.88 g of 96% $H_2SO_4$ are added over 10–15 minutes through an addition funnel to the warm $K_3Co(CN)_6$ solution. 400 g methanol are added in increments to the 40–45° C. mixture, and the mixture stirred for about 30 minutes. The mixture is then chilled and vacuum filtered at 10° C. to recover the methanolic $H_3Co(CN)_6$ solution. This solution is added over about 2 hours to a mixture of 1200 g methanol, 12.3 g $H_2SO_4$, 39.17 g ZnO and 95.02 g trimethylolpropane, followed by stirring for about 10 minutes. 1900.33 g Voranol™ 2070 polyol are then added to the resulting slurry. The batches are combined and vacuum stripped, with vacuum and temperature increasing to ~20 mbar and 80° C. at the end of the strip. 14.34 kg of a slurry containing 3% DMC catalyst are obtained.

The resulting catalyst slurry 1B is evaluated for propylene oxide polymerization using the 500 ml reactor method. Enough of the catalyst dispersion is used to provide 400 ppm DMC catalyst, based on the combined weight of slurry and added initiator. The PO feed rate is 10 ml/min. The induction period is 11 minutes. The resulting polymer has a molecular weight of 2919 and an unsaturation level of 0.020 meq/g.

EXAMPLE 2

Preparation and Evaluation of Catalyst Slurry 2A 51.31 g of $H_3Co(CN)_6$ solution B (which contains about 5.4–6.0 mmol $H_3Co(CN)_6$ and about 6 mmol $H_2SO_4$) are added dropwise over 40 minutes, with stirring, to a slurry of ZnO (1.225 g, 15.0 mmol) in methanol (50 g). A small quantity of methanol is used to rinse the equipment. Most of the ZnO disappears as it reacts during the addition. The slurry is stirred for 10 minutes after the addition is completed. Finely divided particles of DMC catalyst are suspended in a liquid phase having pH of 5. Some unreacted ZnO remains. The idealized reaction can be expressed as:

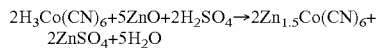

$2H_3Co(CN)_6 + 5ZnO + 2H_2SO_4 \rightarrow 2Zn_{1.5}Co(CN)_6 + 2ZnSO_4 + 5H_2O$ Voranol™ 2070 polyol (139.6 g) are then added and the mixture is stirred briefly. Volatiles (including the methanol) are then distilled from the slurry on a rotoevaporator at temperatures gradually increasing to 75–80° C. and vacuum gradually increasing to 15–30 Torr (2–4 kPa), with a slight nitrogen sweep. The final product weighs 142.48 g and contains about 2.00% dispersed DMC catalyst particles.

Catalyst Slurry 2A is evaluated using the vial method. 0.0037 parts Catalyst Slurry 2A, 0.1191 parts Voranol™ 2070 polyol and 0.5921 parts propylene oxide are charged to the vial, yielding an approximate DMC concentration of 104 ppm with respect to the total vial charge. Induction time is 10 minutes, and the yield of PO to polymer is 53%. Repeats of this testing show induction times of 28 and 14 minutes, and yields of 26 and 33%.

Preparation and Evaluation of Catalyst Slurry 2B

Catalyst Slurry 2B is made in the same general manner as Catalyst Slurry 2A, except only 1.06 g (13.0 mmol) of ZnO is used and the amount of Voranol™ 2070 polyol is only 123.7 g. The idealized reaction can be expressed as:

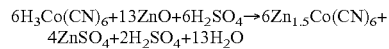

$6H_3Co(CN)_6 + 13ZnO + 6H_2SO_4 \rightarrow 6Zn_{1.5}Co(CN)_6 + 4ZnSO_4 + 2H_2SO_4 + 13H_2O$ The final product weighs 128.61 g and contains about 1.96% dispersed DMC catalyst particles.

Catalyst Slurry 2B is evaluated using the vial method. 0.0037 parts Catalyst Slurry 2B, 0.1237 parts Voranol™ 2070 polyol and 0.5972 parts propylene oxide are charged to the vial, yielding an approximate DMC concentration of 102 ppm. Induction time is 15 minutes and the yield of PO to polymer is 23%.

Preparation and Evaluation of Catalyst Slurry 2C 51.31 g of $H_3Co(CN)_6$ solution B (which contains about 5.46.0 mmol $H_3Co(CN)_6$ and about 6.0 mmol $H_2SO_4$) are added dropwise over 35 minutes, with stirring, to a slurry of ZnO (0.49 g, 6.0 mmol) and $ZnCl_2$ (2.45 g, 18 mmol) in methanol (50 g). A small quantity of methanol is used to rinse the equipment. Most of the ZnO disappears as it reacts during the addition. The slurry is stirred for 10 minutes after the addition is completed. The idealized reaction can be expressed as:

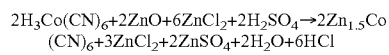

$2H_3Co(CN)_6 + 2ZnO + 6ZnCl_2 + 2H_2SO_4 \rightarrow 2Zn_{1.5}Co(CN)_6 + 3ZnCl_2 + 2ZnSO_4 + 2H_2O + 6HCl$ Voranol™ 2070 polyol (152.2 g) is then added and the mixture is stirred briefly. Volatiles (including the methanol) are then distilled from the slurry on a rotoevaporator at temperatures gradually increasing to 75–80° C. and vacuum gradually increasing to 15–30 Torr (2–4 kPa), with a slight nitrogen sweep. The final product weighs 156.49 g and contains about 1.98% dispersed DMC catalyst particles.

Catalyst Slurry 2C is evaluated using the vial method. 0.0037 parts Catalyst Slurry 2C, 0.1318 parts Voranol™ 2070 polyol and 0.5931 parts propylene oxide are charged to the vial, yielding an approximate DMC concentration of 102 ppm. Induction time is 31 minutes and the yield of PO to polymer is 100%.

EXAMPLE 3

Preparation and Evaluation of Catalyst Slurry 3

49.191 g of $H_3Co(CN)_6$ solution C (which contains about 5.4–6.0 mmol $H_3Co(CN)_6$ and about 6.0 mmol $H_2SO_4$) are added dropwise over 60 minutes, with stirring, to a slurry of ZnO (1.10 g, 13.50 mmol) and $ZnCl_2$ (0.2 g, 1.5 mmol) in methanol (50 g). A small quantity of methanol is used to rinse the equipment. Most of the ZnO disappears as it reacts during the addition. The slurry is stirred for 10 minutes after the addition is completed. The idealized reaction can be expressed as:

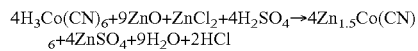

$4H_3Co(CN)_6 + 9ZnO + ZnCl_2 + 4H_2SO_4 \rightarrow 4Zn_{1.5}Co(CN)_6 + 4ZnSO_4 + 9H_2O + 2HCl$ Voranol™ 2070 polyol (13.72 g) is then added and the mixture is stirred briefly. Volatiles (including the methanol) are then distilled from the slurry on a rotoevaporator at temperatures gradually increasing to 75–80° C. and vacuum gradually increasing to 15–30 Torr (2–4 kPa), with a slight nitrogen sweep. The final product weighs 142.43 g and contains about 2.00% dispersed DMC catalyst particles.

Catalyst Slurry 3 is evaluated using the vial method. 0.0037 parts Catalyst Slurry 3, 0.1199 parts Voranol™ 2070 polyol and 0.5787 parts propylene oxide are charged to the vial, yielding an approximate DMC concentration of 104 ppm. Induction time is 19 minutes, and the yield of PO to polymer is 51%.

EXAMPLE 4

Preparation and Evaluation of Catalyst Slurry 4A 18.51 g of $H_3Co(CN)_6$ solution D (which contains about 5.5–6.5 mmol $H_3Co(CN)_6$ and about 6.5 mmol $H_2SO_4$) are added dropwise over 60 minutes, with stirring, to a slurry of ZnO (1.13 g, 13.9 mmol), $ZnCl_2$ (0.41 g, 3.0 mmol) and trimethylolpropane (3.62 g, 27 mmol) in methanol (75 g). A small quantity of methanol is used to rinse the equipment. Most of the ZnO disappears as it reacts during the addition. The slurry is stirred for 10 minutes after the addition is completed. At this point, the slurry has a final pH of 2–3. An additional 0.3 g (3.7 mmol) of ZnO is added to raise the pH to 4–5. The idealized reaction can be expressed as:

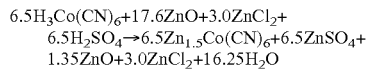

$$6.5H_3Co(CN)_6 + 17.6ZnO + 3.0ZnCl_2 + 6.5H_2SO_4 \rightarrow 6.5Zn_{1.5}Co(CN)_6 + 6.5ZnSO_4 + 1.35ZnO + 3.0ZnCl_2 + 16.25H_2O$$

Voranol™ 2070 polyol (108.56 g) is then added and the mixture is stirred briefly. Volatiles (including the methanol) are then distilled from the slurry on a rotoevaporator at temperatures gradually increasing to 75–80° C. and vacuum gradually increasing to 15–30 Torr (2–4 kPa), with a slight nitrogen sweep. The final product weighs 115.64 g and contains about 2.12% dispersed DMC catalyst particles.

The resulting catalyst slurry 4A is evaluated for propylene oxide polymerization using the 500 ml reactor method. Enough of the slurry catalyst is used to provide 1500 ppm DMC catalyst in the starting slurry/initiator mixture. The PO feed rate is 5 ml/min. The induction period is 3 minutes. The resulting polymer has a molecular weight of 6045 and an unsaturation level of 0.014 meq/g. Viscosities at 100° F. and 210° F. are 928 and 106 cSt, respectively.

Preparation and Evaluation of Catalyst Slurry 4B 8.50 g of $H_3Co(CN)_6$ solution D (which contains about 2.7–3.0 mmol $H_3Co(CN)_6$ and about 3.0 mmol $H_2SO_4$) are added dropwise over 60 minutes, with stirring, to a slurry of ZnO (0.73 g, 9.0 mmol), $ZnSO_4 \cdot 7H_2O$ (0.43 g, 1.5 mmol) and trimethylolpropane (1.87 g, 14 mmol) in methanol (40 g). A small quantity of methanol is used to rinse the equipment. Most of the ZnO disappears as it reacts during the addition. The slurry is stirred for 20 minutes after the addition is completed. The idealized reaction can be expressed as:

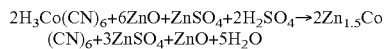

$$2H_3Co(CN)_6 + 6ZnO + ZnSO_4 + 2H_2SO_4 \rightarrow 2Zn_{1.5}Co(CN)_6 + 3ZnSO_4 + ZnO + 5H_2O$$

Voranol™ 2070 polyol (56 g) is then added and the mixture is stirred briefly. Volatiles (including the methanol) are then distilled from the slurry on a rotoevaporator at temperatures gradually increasing to 75–80° C. and vacuum gradually increasing to 15–30 Torr (2–4 kPa), with a slight nitrogen sweep. The final product weighs 59.59 g and contains about 1.98% dispersed DMC catalyst particles.

Catalyst Slurry 4B is evaluated using the vial method. 0.0037 parts Catalyst Slurry 4B, 0.1369 parts Voranol™ 2070 polyol and 0.5892 parts propylene oxide are charged to the vial, yielding an approximate DMC concentration of 112 ppm. Induction time is 29 minutes, and the yield of PO to polymer is 100%. The polymerization is complete in about 46 minutes.

Preparation and Evaluation of Catalyst Slurry 4C 8.5 g of $H_3Co(CN)_6$ solution D (which contains about 2.7–3.0 mmol $H_3Co(CN)_6$ and about 3.0 mmol $H_2SO_4$) are added dropwise over 60 minutes, with stirring, to a slurry of ZnO (0.49 g, 6.0 mmol), $ZnCl_2$ (0.41 g, 3.0 mmol) and trimethylolpropane (1.81 g, 13 mmol) in methanol (40 g). A small quantity of methanol is used to rinse the equipment. Most of the ZnO disappears at it reacts during the addition. The slurry is stirred for 20 minutes after the addition is completed. The idealized reaction can be expressed as:

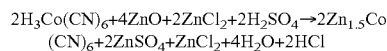

$$2H_3Co(CN)_6 + 4ZnO + 2ZnCl_2 + 2H_2SO_4 \rightarrow 2Zn_{1.5}Co(CN)_6 + 2ZnSO_4 + ZnCl_2 + 4H_2O + 2HCl$$

Voranol™ 2070 polyol (54.2 g) is then added and the mixture is stirred briefly. Volatiles (including the methanol) are then distilled from the slurry on a rotoevaporator at temperatures gradually increasing to 75–80° C. and vacuum gradually increasing to 15–30 Torr (2–4 kPa), with a slight nitrogen sweep. The final product weighs 59.83 g and contains about 1.98% dispersed DMC catalyst particles.

Catalyst Slurry 4C is evaluated using the vial method 0.0037 parts Catalyst Slurry 4C, 0.1236 parts Voranol™ 2070 polyol and 0.5921 parts propylene oxide are charged to the vial yielding an approximate DMC concentration of 72 ppm. Induction time is 7 minutes, and the yield of PO to polymer is 68%.

Preparation and Evaluation of Catalyst Slurry 4D 8.5 g of $H_3Co(CN)_6$ solution D (2.7–3.0 mmol $H_3Co(CN)_6$ and about 3.0 mmol $H_2SO_4$) are added dropwise over 60 minutes, with stirring, to a slurry of ZnO (0.24 g, 3.0 mmol), $ZnCl_2$ (0.82 g, 6.0 mmol) and trimethylolpropane (1.81 g, 13 mmol) in methanol (40 g). A small quantity of methanol is used to rinse the equipment. Most of the ZnO disappears as it reacts during the addition. The slurry is stirred for 20 minutes after the addition is completed. The idealized reaction can be expressed as:

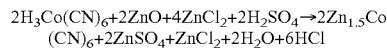

$$2H_3Co(CN)_6 + 2ZnO + 4ZnCl_2 + 2H_2SO_4 \rightarrow 2Zn_{1.5}Co(CN)_6 + 2ZnSO_4 + ZnCl_2 + 2H_2O + 6HCl$$

Voranol™ 2070 polyol (54.2 g) is then added and the mixture is stirred briefly. Volatiles (including the methanol) are then distilled from the slurry on a rotoevaporator at temperatures gradually increasing to 75–80° C. and vacuum gradually increasing to 15–30 Torr (2–4 kPa), with a slight nitrogen sweep. The final product weighs 57.54 g and contains about 1.99% dispersed DMC catalyst particles.

Catalyst Slurry 4D is evaluated using the vial method. 0.0026 parts Catalyst Slurry 4D, 0.1301 parts Voranol™ 2070 polyol and 0.5908 parts propylene oxide are charged to the vial, yielding an approximate DMC concentration of 72 ppm. Induction time is about 17 minutes, and the yield of PO to polymer is 100%. Polymerization is complete in about 2 hours. When repeated using about 104 ppm DMC, polymerization is complete in about 44 minutes.

EXAMPLE 5

Preparation and Evaluation of Catalyst Slurry 5

1 g (7.34 mmol) pentaerythritol is dissolved in 10 g water. This solution is added to 1.63 g (20 mmol) ZnO, 0.41 g (3.0 mmol) $ZnCl_2$ and 75 g methanol to form a slurry. 18.51 g of $H_3Co(CN)_6$ solution D are added dropwise over 35 minutes, with stirring, to the pentaerythritol/ZnO/$ZnCl_2$ slurry. A small quantity of methanol is used to rinse the equipment. Most of the ZnO disappears as it reacts during the addition. The slurry is stirred for 20 minutes after the addition is completed. The idealized reaction can be expressed as:

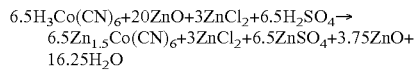

$6.5H_3Co(CN)_6 + 20ZnO + 3ZnCl_2 + 6.5H_2SO_4 \rightarrow 6.5Zn_{1.5}Co(CN)_6 + 3ZnCl_2 + 6.5ZnSO_4 + 3.75ZnO + 16.25H_2O$ Voranol™ 2070 polyol (111.1 g) is then added and the mixture is stirred briefly. Volatiles (including the methanol) are then distilled from the slurry on a rotoevaporator at temperatures gradually increasing to 75–80° C. and vacuum gradually increasing to 15–30 Torr (2–4 kPa), with a slight nitrogen sweep. The final product weighs 115.87 g and contains about 2.12% dispersed DMC catalyst particles.

Catalyst Slurry 5 is evaluated using the vial method. 0.0037 parts Catalyst Slurry 5, 0.1254 parts Voranol™ 2070 polyol and 0.5565 parts propylene oxide are charged to the vial, yielding an approximate DMC concentration of 114 ppm. Induction time is 8 minutes, and the yield of PO to polymer is 100%. Polymerization is complete in about 20 minutes.

EXAMPLE 6

Preparation and Evaluation of Catalyst Slurry 6A 28.28 g of $H_3Co(CN)_6$ solution E (containing approximately 3.0 mmol $H_3Co(CN)_6$) is mixed with 3.0 mmol 96% $H_2SO_4$ in water. This mixture is added dropwise with stirring to a slurry of 15 g water, 0.73 g (9.0 mmol) ZnO, 0.2 g (1.5 mmol) $ZnCl_2$ and 1.81 g (13 mmol) TMP over 75 minutes. Most of the ZnO disappears as it reacts during the addition. The slurry is stirred for 10 minutes after the addition is completed. The idealized reaction can be expressed as:

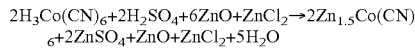

$2H_3Co(CN)_6 + 2H_2SO_4 + 6ZnO + ZnCl_2 \rightarrow 2Zn_{1.5}Co(CN)_6 + 2ZnSO_4 + ZnO + ZnCl_2 + 5H_2O$ Voranol™ 2070 polyol (54.2 g) is then added and the mixture is stirred briefly. Volatiles (including the water) are then distilled from the slurry on a rotoevaporator at temperatures gradually increasing to 75–80° C. and vacuum gradually increasing to 15–30 Torr (2–4 kPa), with a slight nitrogen sweep. The final product weighs 57.78 g and contains about 1.98% dispersed DMC catalyst particles.

Catalyst Slurry 6A is evaluated using the vial method. 0.0026 parts Catalyst Slurry 6A, 0.1234 parts Voranol™ 2070 polyol and 0.5915 parts propylene oxide are charged to the vial, yielding an approximate DMC concentration of 72 ppm. Induction time is 7 minutes, and the yield of PO to polymer is 38%.

Preparation and Evaluation of Catalyst Slurry 6B

A portion of $H_3Co(CN)_6$ solution E is vacuum stripped at 50° C./15–30 Torr (2–4 kPa) vacuum to dryness, and the $H_3Co(CN)_6$ is then re-dissolved in methanol to form a 2.00% solution. An amount of this solution containing 3.00 mmol $H_3Co(CN)_6$ is mixed with 3.0 mmol 96% $H_2SO_4$ in methanol. This mixture is added dropwise with stirring to a slurry of 0.73 g (9.0 mmol) ZnO, 0.2 g (1.5 mmol) $ZnCl_2$ and 1.81 g (13 mmol) TMP in 30 g methanol, over 75 minutes. Most of the ZnO disappears as it reacts during the addition. The slurry is stirred for 10 minutes after the addition is completed. The idealized reaction can be expressed as:

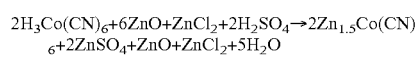

$2H_3Co(CN)_6 + 6ZnO + ZnCl_2 + 2H_2SO_4 \rightarrow 2Zn_{1.5}Co(CN)_6 + 2ZnSO_4 + ZnO + ZnCl_2 + 5H_2O$ Voranol™ 2070 polyol (54.2 g) is then added and the mixture is stirred briefly. Volatiles (including the methanol) are then distilled from the slurry on a rotoevaporator at temperatures gradually increasing to 75–80° C. and vacuum gradually increasing to 15–30 Torr (2–4 kPa), with a slight nitrogen sweep. The final product weighs 57.6 g and contains about 1.98% dispersed DMC catalyst particles.

Catalyst Slurry 6B is evaluated using the vial method. 0.0037 parts Catalyst Slurry 6B, 0.1259 parts Voranol™ 2070 polyol and 0.5906 parts propylene oxide are charged to the vial, yielding an approximate DMC concentration of 72 ppm. Induction time is 7 minutes and the yield of PO to polymer is 68%.

Preparation and Evaluation of Catalyst Slurry 6C 28.28 g of $H_3Co(CN)_6$ solution E containing approximately 3.0 mmol $H_3Co(CN)_6$ is added dropwise with stirring to a slurry of 15 g water, 0.45 g (5.5 mmol) ZnO, 0.68 g (5.0 mmol) $ZnCl_2$ and 1.81 g (13 mmol) TMP over 55 minutes. Most of the ZnO disappears as it reacts during the addition. The slurry is stirred for 10 minutes after the addition is completed. The idealized reaction can be expressed as:

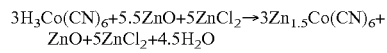

$3H_3Co(CN)_6 + 5.5ZnO + 5ZnCl_2 \rightarrow 3Zn_{1.5}Co(CN)_6 + ZnO + 5ZnCl_2 + 4.5H_2O$ Voranol™ 2070 polyol (54.3 g) is then added and the mixture is stirred briefly. Volatiles (including the methanol) are then distilled from the slurry on a rotoevaporator at temperatures gradually increasing to 75–80° C. and vacuum gradually increasing to 15–30 Torr (2–4 kPa), with a slight nitrogen sweep. The final product weighs 57.67 g and contains about 1.98% dispersed DMC catalyst particles.

Catalyst Slurry 6C is evaluated using the vial method. 0.0037 parts Catalyst Slurry 6C, 0.1251 parts Voranol™ 2070 polyol and 0.5911 parts propylene oxide are charged to the vial, yielding an approximate DMC concentration of 102 ppm. Induction time is 7 minutes and the yield of PO to polymer is 6%.

EXAMPLE 7

Preparation and Evaluation of Catalyst Slurry 7

8.5 g of $H_3Co(CN)_6$ solution D (which contains about 2.7–3.0 mmol $H_3Co(CN)_6$ and about 3.0 mmol $H_2SO_4$) are added dropwise over 260 minutes, with stirring, to a slurry of ZnO (0.73 g, 9 mmol), zinc trifluoromethane sulfonate $(Zn(OTf)_2, 0.55$ g, 1.5 mmol) and trimethylolpropane (2.35 g, 17.5 mmol) in methanol (40 g). A small quantity of methanol is used to rinse the equipment. Most of the ZnO disappears as it reacts during the addition. The slurry is stirred for 45 minutes after the addition is completed. The idealized reaction can be expressed as:

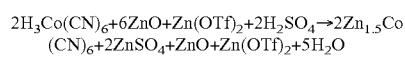

$2H_3Co(CN)_6 + 6ZnO + Zn(OTf)_2 + 2H_2SO_4 \rightarrow 2Zn_{1.5}Co(CN)_6 + 2ZnSO_4 + ZnO + Zn(OTf)_2 + 5H_2O$ Voranol™2070 polyol (70.37 g) is then added and the mixture is stirred briefly. Volatiles (including the methanol) are then distilled from the slurry on a rotoevaporator at temperatures gradually increasing to 75–80° C. and vacuum gradually increasing to 15–30 Torr (2–4 kPa), with a slight nitrogen sweep. The final product weighs 74.62 g and contains about 2.00% dispersed DMC catalyst particles.

Catalyst Slurry 7 is evaluated using the vial method. 0.0037 parts Catalyst Slurry 7, 0.1282 parts Voranol™ 2070 polyol and 0.5961 parts propylene oxide are charged to the vial, yielding an approximate DMC concentration of 102 ppm. Induction time is 51 minutes and the yield of PO to polymer is 58%.

EXAMPLE 8

Preparation and Evaluation of Catalyst Slurry 8A 1.38 g of a 45% solution of hexafluorozirconic acid in water are added to a slurry of ZnO (0.85 g, 10.5 mmol) and trimethylolpropane (3.53 g, 26 mmol) in methanol (40 g). 8.5 g of $H_3Co(CN)_6$ solution F (which contains about 2.7–3.0 mmol $H_3Co(CN)_6$ and about 3.0 mmol $H_2SO_4$) are added dropwise over 30 minutes, with stirring. A small quantity of methanol is used to rinse the equipment. Most of the ZnO disappears as it reacts during the addition. The slurry is stirred for 20 minutes after the addition is completed. The idealized reaction can be expressed as:

$$H_3Co(CN)_6 + 3.5ZnO + H_2SO_4 + H_2ZrF_6 \rightarrow Zn_{1.5}Co(CN)_6 + ZnSO_4 + ZnZrF_6 + 3.5H_2O$$

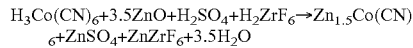

Voranol™ 2070 polyol (106 g) is then added and the mixture is stirred briefly. Volatiles (including the methanol) are then distilled from the slurry on a rotoevaporator at temperatures gradually increasing to 75–80° C. and vacuum gradually increasing to 15–30 Torr (2–4 kPa), with a slight nitrogen sweep. The final product weighs 111.51 g and contains about 2.00% dispersed DMC catalyst particles.

Catalyst Slurry 8A is evaluated using the vial method. 0.0037 parts Catalyst Slurry 3, 0.1252 parts Voranol™ 2070 polyol and 0.5937 parts propylene oxide are charged to the vial yielding an approximate DMC concentration of 103 ppm. Induction time is 26 minutes and the yield of PO to polymer is 64%.

Preparation and Evaluation of Catalyst Slurry 8B 0.82 g of a 60% solution of hexafluorotitanic acid in water is added to a slurry of ZnO (0.85 g, 10.5 mmol) and trimethylolpropane (3.53 g, 26 mmol) in methanol (40 g). 8.5 g of $H_3Co(CN)_6$ solution F (2.7–3.0 mmol $H_3Co(CN)_6$ and about 3.0 mmol $H_2SO_4$) are added dropwise over 25 minutes, with stirring. A small quantity of methanol is used to rinse the equipment. Most of the ZnO disappears during the addition. The slurry is stirred for 20 minutes after the addition is completed. The idealized reaction can be expressed as:

$$H_3Co(CN)_6 + 3.5ZnO + H_2SO_4 + H_2TiF_6 \rightarrow Zn_{1.5}Co(CN)_6 + ZnSO_4 + ZnTiF_6 + 3.5H_2O$$

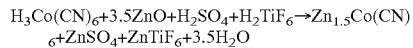

Voranol™ 2070 polyol (99.82 g) is then added and the mixture is stirred briefly. Volatiles (including the methanol) are then distilled from the slurry on a rotoevaporator at temperatures gradually increasing to 75–80° C. and vacuum gradually increasing to 15–30 Torr (2–4 kPa), with a slight nitrogen sweep. The final product weighs 105.06 g and contains about 2.00% dispersed DMC catalyst particles.

Catalyst Slurry 8B is evaluated using the vial method. 0.0037 parts Catalyst Slurry 8B, 0.1246 parts Voranol™ 2070 polyol and 0.5930 parts propylene oxide are charged to the vial, yielding an approximate DMC concentration of 103 ppm. Induction time is 26 minutes, and the yield of PO to polymer is 81%.

EXAMPLE 9

Preparation and Evaluation of Catalyst Slurry 9

267.07 g of a solution containing a maximum of 4.91% $H_3Co(CN)_6$ (13.12 g, 60.18 mmol) and $H_2SO_4$ (about 60 mmol) are prepared in the same manner as $H_3Co(CN)_6$ solution A. This entire solution is added over 83 minutes to a stirred slurry of ZnO (14.69 g, 180.5 mmol) and trimethylolpropane (47.8 g, 356.2 mmol) in methanol (600 g). A small quantity of methanol is used to rinse the equipment. Most of the ZnO disappears at it reacts during the addition. The slurry is stirred for 20 minutes after the addition is completed. The idealized reaction can be expressed as:

$$2H_3Co(CN)_6 + 6ZnO + 2H_2SO_4 \rightarrow 2Zn_{1.5}Co(CN)_6 + 2ZnSO_4 + ZnO + 5H_2O$$

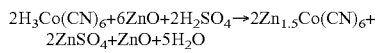

Voranol™ 2070 polyol (956.5 g) is then added and the mixture is stirred briefly. Volatiles (including the methanol) are then distilled from the slurry on a rotoevaporator at temperatures gradually increasing to 75–80° C. and vacuum gradually increasing to 15–30 Torr (2–4 kPa), with a slight nitrogen sweep. The final product weighs 1034.18 g and contains about 3.01% dispersed DMC catalyst particles.

The resulting Catalyst Slurry 9 is evaluated for propylene oxide polymerization using the 500 ml reactor method. Enough of the slurry catalyst is used to provide 1500 ppm DMC catalyst, based on the weight of the starting slurry/initiator mixture. The PO feed rate is 5 ml/min The induction period is not determined. The resulting polymer has a molecular weight of 6146 and an unsaturation level of 0.024 meq/g. Viscosity at 100° F. and 210° F. is 1270 and 146 cSt, respectively.

EXAMPLE 10

Preparation and Evaluation of Catalyst Slurry 10

267.96 g of a solution containing a maximum of 4.90% $H_3Co(CN)_6$ (13.12 g, 60.18 mmol) and $H_2SO_4$ (about 60 mmol) are prepared in the same manner as $H_3Co(CN)_6$ solution A. This solution is mixed with 6.15 g of a 96% solution of $H_2SO_4$ (5.90 g, 60.18 mmol). The resulting mixture is added over about 2 hours to a stirred slurry of ZnO (16.65 g, 206.4 mmol) and trimethylolpropane (47.8 g, 356.2 mmol) in methanol (600 g). A small quantity of methanol is used to rinse the equipment. Most of the ZnO disappears as it reacts during the addition. The slurry is stirred for 20 minutes after the addition is completed. The idealized reaction can be expressed as:

$$12H_3Co(CN)_6 + 41ZnO + 24H_2SO_4 \rightarrow 12Zn_{1.5}Co(CN)_6 + 23ZnSO_4 + H_2SO_4 + 41H_2O$$

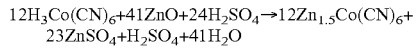

Voranol™ 425 polyol (a 425 molecular weight poly (propylene oxide) diol from Dow Chemical) (951.6 g) is then added and the mixture is stirred briefly. Volatiles (including the methanol) are then distilled from the slurry on a rotoevaporator at temperatures gradually increasing to 75–80° C. and vacuum gradually increasing to 15–30 Torr (2–4 kPa), with a slight nitrogen sweep. The final product weighs 1037.1 g and contains about 3.00% dispersed DMC catalyst particles. The slurry has a pH of about 4.

The resulting Catalyst Slurry 10 is evaluated for propylene oxide polymerization using the 500 ml reactor method. Enough of the slurry catalyst is used to provide 600 ppm DMC catalyst, based on the weight of the starting slurry/initiator mixture. The PO feed rate is 10 ml/min. The induction period is 11 minutes. The resulting polymer has a molecular weight of 2967 and an unsaturation level of 0.014 meq/g.

EXAMPLE 11

Preparation and Evaluation of Catalyst Slurry 11

271.2 g of a solution containing a maximum of 4.84% $H_3Co(CN)_6$ (13.12 g, 60.18 mmol) and $H_2SO_4$ (about 60 mmol) is prepared in the same manner as $H_3Co(CN)_6$ solution A. The solution is added over about 2 hours to a stirred slurry of ZnO (14.69 g, 180.5 mmol), $ZnCl_2$ (4.10 g, 30.09 mmol), t-butanol (47.8 g, 645 mmol) and P4000 polyol (poly(propylene oxide diol, 4000 MW, 47.8 g, ~12 mmol) in methanol (600 g). A small quantity of methanol is used to rinse the equipment. Most of the ZnO disappears as it reacts during the addition. The slurry is stirred for 20 minutes after the addition is completed. The idealized reaction can be expressed as:

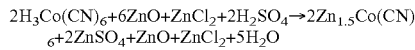

Voranol™ 2070 polyol (956.5 g) is then added and the mixture is stirred briefly. Volatiles (including the methanol) are then distilled from the slurry on a rotoevaporator at temperatures gradually increasing to 75–80° C. and vacuum gradually increasing to 15–30 Torr (2–4 kPa), with a slight nitrogen sweep. The final product weighs 1039.93 g and contains about 2.99% dispersed DMC catalyst particles.

The resulting Catalyst Slurry 11 is evaluated for propylene oxide polymerization using the 500 ml reactor method. Enough of the slurry catalyst is used to provide 1500 ppm DMC catalyst, based on the weight of the starting slurry/initiator mixture. The PO feed rate is 5 ml/min. The induction period is 13 minutes. The resulting polymer has a molecular weight of 2905 and an unsaturation level of 0.014 meq/g.

EXAMPLE 12

Preparation and Evaluation of Catalyst Slurry 12

271.98 g of a solution containing a maximum of 4.82% $H_3Co(CN)_6$ (13.12 g, 60.18 mmol) and $H_2SO_4$ (about 60 mmol) are prepared in the same manner as $H_3Co(CN)_6$ solution A. The solution is added over 105 minutes to a stirred slurry of ZnO (14.69 g, 180.5 mmol), $ZnCl_2$ (4.1 g, 30.09 mmol), t-butanol (47.8 g,) and trimethylolpropane (47.8 g, 356.2 mmol) in methanol (600 g). A small quantity of methanol is used to rinse the equipment. Most of the ZnO disappears as it reacts during the addition. The slurry is stirred for overnight after the addition is completed. The idealized reaction can be expressed as:

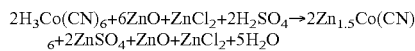

Voranol™ 2070 polyol (956.5 g) is then added and the mixture is stirred briefly. t-butanol (452.2 g) is then stirred in. Volatiles (including the methanol) are then distilled from the slurry on a rotoevaporator at temperatures gradually increasing to 75–80° C. and vacuum gradually increasing to 15–30 Torr (2–4 kPa), with a slight nitrogen sweep. The final product weighs 1040.32 g and contains about 2.99% dispersed DMC catalyst particles. The slurry has a pH of about 6.

The resulting Catalyst Slurry 12 is evaluated for propylene oxide polymerization using the 500 ml reactor method. Enough of the slurry catalyst is used to provide 1500 ppm DMC catalyst, based on the weight of the starting slurry/initiator mixture. The PO feed rate is 5 ml/min. The induction period is 10 minutes. The resulting polymer has a molecular weight of 2905 and an unsaturation level of 0.021 meq/g.

EXAMPLE 13

ZnO (9.80 g, 120.4 mmol), trimethylolpropane (23.75 g, 177 mmol) and methanol (300 g) are charged to a one-liter Morton flask equipped with a flexible stirrer shaft and an addition funnel. The resulting slurry is stirred at room temperature for about 30 minutes to disperse the ZnO. 149.24 g of $H_3Co(CN)_6$ solution G (which contains about 30.09 mmol $H_3Co(CN)_6$ and about 1.407 meq $H^+$/g of solution) are added dropwise over 78 minutes with stirring to the ZnO slurry. A small quantity of methanol is used to rinse the equipment. Most of the ZnO disappears as it reacts during the addition. The slurry is stirred for 30 minutes after the addition is completed. Finely divided particles of DMC catalyst are suspended in a liquid phase. A very small amount of unreacted ZnO remains. The idealized reaction can be expressed as:

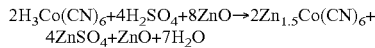

Voranol™ 2070 polyol (158.32 g) is then added and the mixture is distilled at 60° C./150 Torr (20 kPa) vacuum for 10 minutes. A second portion of Voranol™ 2070 polyol (158.36 g) is added followed by a second distillation under the same conditions. A third portion of Voranol™ 2070 polyol (158.28 g) is added. Volatiles (including the methanol) are then distilled from the slurry on a rotoevaporator, at temperatures gradually increasing from 60° C./150 Torr (20 kPa) vacuum to 80° C./15–20 Torr (2–2.7 kPa) vacuum, with a nitrogen sweep. The final product weight 526.45 g, and contains about 3.00% dispersed DMC catalyst particles. Karl Fischer water titration indicates that the slurry contains 1788 ppm water.

EXAMPLE 14

ZnO (9.80 g, 120.4 mmol), trimethylol propane (23.75 g, 177 mmol) and methanol (300 g) are charged to a one-liter Morton flask equipped with a flexible stirrer shaft and an addition funnel. The resulting slurry is stirred at room temperature for about 30 minutes to disperse the ZnO. 157.24 g of $H_3Co(CN)_6$ solution H (which contains about 30.09 mmol $H_3Co(CN)_6$ and about 210 meq $H^+$) are added dropwise over 68 minutes with stirring to the ZnO slurry. A small quantity of methanol is used to rinse the equipment. Most of the ZnO disappears as it reacts during the addition. The slurry is stirred for 60 minutes after the addition is completed. Finely divided particles of DMC catalyst are suspended in a liquid phase. A very small amount of unreacted ZnO remains The idealized reaction can be expressed as:

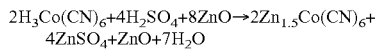

"IP-625" polyol (a 625 molecular weight glycerine ethoxylate, 158.28 g) is then added and the mixture is distilled at 60° C./150 Torr (20 kPa) vacuum for 10 minutes. A second portion of "IP-625" polyol (158.67 g) is added followed by a second distillation under the same conditions. A third portion of "IP-625" polyol (158.00 g) is added. Volatiles (including the methanol) are then distilled from the slurry on a rotoevaporator, at temperatures gradually increasing from 60° C./150 Torr (20 kPa) vacuum to 80° C./15–20 Torr (2–2.7 kPa) vacuum, with a nitrogen sweep. The final product weight is 520.12 g, and contains about 2.99% dispersed DMC catalyst particles.

Karl Fischer water titration indicates that the slurry contains 3400 ppm water. The water level is reduced to about 2000 ppm by stripping an additional 3 hours at 80° C./15–20 Torr (2–2.7 kPa) vacuum.

EXAMPLE 15

Duplicate batches of methanolic $H_3Co(CN)_6$ solution are prepared as follows: $K_3Co(CN)_6$ (FW 332.35, 700.0 g, 2.106 mol) is added to a 15 liter carboy. Hot (80–90° C.) deionized water (1631 g) is added. The mixture is stirred for five minutes to dissolve the salt. Concentrated (96%) $H_2SO_4$ (861.0 g, approximately 8.433 mol $H_2SO_4$) is added via addition funnel over about 30 minutes to the stirred, warm solution of $K_3Co(CN)_6$. A light yellow solution is obtained, which is stirred for 5 more minutes. The temperature is maintained at about 60° C. Methanol (7000 g) is added to the solution over 70 minutes. During the addition, $K_2SO_4$ and/or $KHSO_4$ precipitates as a granular white solid and the temperature of the reaction mixture drops to 37° C. Solids that form around the walls of the reactor are physically broken up and redispersed into the liquid phase. Following the methanol addition, the slurry is stirred for 5 minutes. The reactor contents are then cooled in an ice bath to reduce the temperature to 7–10° C. and then vacuum filtered in batches using a Buchner funnel, Whatman™ 1 paper and a glass vacuum filtration flask. The salt cake is rinsed with about 1050 g cold methanol; the rinses are combined with the filtrate. The filtrate from the first batch is a light yellow, clear solution weighing 10,436.6 g and containing a maximum of 4.40% $H_3Co(CN)_6$. That from the second batch weighs 10,491.3 g and contains a maximum of 4.38% $H_3Co(CN)_6$.

Trimethylolpropane (3.325 kg) and ZnO (1.371 kg) are loaded into a 50-gallon glass-lined reactor and heated to 30° C. Methanol (42.27 kg) is added with stirring while holding the temperature at 30° C.; the resulting slurry is then stirred at this temperature for about 1 hour. The first batch of $H_3Co(CN)_6$ solution is added over 55 minutes with stirring, followed by the second batch, which was added over a like period. The containers holding the $H_3Co(CN)_6$ solutions are rinsed with 0.7 kg (total) methanol which is added to the reactor. After addition of the $H_3Co(CN)_6$ solutions, the resulting slurry is stirred for an additional 15 minutes.

Voranol™ 2070 polyol (16.625 kg) is pumped into the reactor containing the catalyst slurry. The pressure in the reactor is reduced to about 150 Torr (20 kPa) with stirring, a nitrogen sweep is begun, and the temperature is raised to 30–40° C. When about 14.5 kg of overheads are removed in this manner, a second portion of 16.625 kg Voranol™ 2070 polyol is added. The process of distilling and polyol addition is continued until four portions of the polyol have been added and most of the volatiles are removed after the final polyol addition. Then the reactor contents are heated to about 80° C., at a pressure of 10–20 Torr (1.4–2.7 kPa) for 3 hours. The product is then cooled to 45° C., filtered through a 300 micron bag filter and packaged into 5-gallon drums. The final mass of drummed product is 69.995 kg of slurry containing a maximum of about 3 wt. % DMC catalyst. The measured water content of 2525 ppm.

A portion of the resulting catalyst slurry is evaluated using the vial method. 0.12 parts Voranol™ 2070 polyol and 0.58 parts propylene oxide are charged to the vial together with enough of the catalyst slurry to provide about 100 ppm of DMC solids relative to the total charge. The mixture becomes clear after about 9 minutes at 90° C., visually observable polymerization occurs after about 20 minutes, and polymerization is completed after about 55 minutes to give 96% yield of polymer.

What is claimed is:

1. A method for preparing a metal cyanide catalyst, comprising mixing an acidic metal cyanide compound with an insoluble metal salt in a solvent medium for the acidic metal cyanide compound under conditions such that the insoluble metal salt and the acidic metal cyanide compound react to form a multimetal cyanide catalyst insoluble in the solvent medium, wherein:
    a) the acidic metal cyanide compound is represented by the general formula $H_w[M^1(CN)_r(X)_t]$ in which $M^1$ is a transition metal ion; each X represents a group other than cyanide that coordinates with the $M^1$ ion; r is from 4 to 6, t is from 0 to 2, and w represents the absolute value of the valence of the $M^1(CN)_r(X)_t$ group; and
    b) the insoluble metal salt is insoluble in the solvent medium and is represented by the general formula $M_xA_y$, wherein M is a metal ion that forms an insoluble precipitate with the metal cyanide grouping $M^1(CN)_r(X)_t$, A represents an anion that forms a salt of M that is insoluble in the solvent medium, and x and y are integers that balance the charges in the insoluble metal salt.

2. The method of claim 1 wherein said acidic metal cyanide compound includes $H_3Co(CN)_6$.

3. The method of claim 1 wherein the insoluble metal salt is a zinc salt.

4. The method of claim 3 wherein an auxiliary acid is present.

5. The method of claim 1 wherein a soluble metal salt is present.

6. The method of claim 1 wherein the solvent medium is water, a polar organic compound, a mixture of two or more organic compounds, or a mixture of water and a polar organic compound.

7. The method of claim 1 wherein the solvent medium is water, methanol or a mixture of water and methanol.

8. The method of claim 1 wherein the solvent medium is a nonvolatile initiator compound or polyether.

9. The method of claim 1 further comprising dispersing the resulting mixture in a nonvolatile initiator compound, polyether or mixture of a nonvolatile initiator compound and a polyether to form a dispersion, and removing at least one component of said solvent medium, wherein at least one component of said solvent medium is removable from said dispersion.

10. The method of claim 9 wherein the initiator compound is a low molecular weight polyether polyol having an equivalent weight of about 125–500.

11. The method of claim 9 wherein said acidic metal cyanide compound includes $H_3Co(CN)_6$.

12. The method of claim 9 wherein the metal salt is a zinc salt.

13. The method of claim 9 wherein the initiator is a polyalcohol.

14. The method of claim 9 wherein the solvent medium is water, a polar organic compound, a mixture of two or more polar organic compounds, or a mixture of water and a polar organic compound.

15. The method of claim 9 wherein the solvent medium is water, methanol, or a mixture of water and methanol.

* * * * *